US011315067B2

(12) United States Patent
Bulcao et al.

(10) Patent No.: US 11,315,067 B2
(45) Date of Patent: Apr. 26, 2022

(54) LOGISTICAL MANAGEMENT SYSTEM

(71) Applicant: Airspace Technologies, Inc., Carlsbad, CA (US)

(72) Inventors: Nick Bulcao, Encinitas, CA (US); Ryan Rusnak, Encinitas, AZ (US); Rick Nyhan, Scottsdale, AZ (US); Adam Frazin, Poolesville, MD (US); Peter Fitzgibbons, Vista, CA (US)

(73) Assignee: Airspace Technologies, Inc., Carlsbad, CA (US)

( * ) Notice: Subject to any disclaimer, the term of this patent is extended or adjusted under 35 U.S.C. 154(b) by 501 days.

(21) Appl. No.: 15/295,112

(22) Filed: Oct. 17, 2016

(65) Prior Publication Data
US 2018/0107967 A1   Apr. 19, 2018

(51) Int. Cl.
*G06Q 10/08*   (2012.01)
*G01C 21/34*   (2006.01)
*G06Q 30/04*   (2012.01)
*G01C 21/36*   (2006.01)
*G06Q 50/28*   (2012.01)

(52) U.S. Cl.
CPC ....... *G06Q 10/083* (2013.01); *G01C 21/3407* (2013.01); *G06Q 30/04* (2013.01); *G01C 21/3667* (2013.01)

(58) Field of Classification Search
CPC ...... G06Q 10/083; G06Q 30/04; G06Q 50/28; G01C 21/3407; G01C 21/3667
USPC .......................................................... 705/330
See application file for complete search history.

(56) References Cited

U.S. PATENT DOCUMENTS

| 7,340,405 | B1 * | 3/2008  | Gunther ............... G06Q 10/025 705/6 |
| 7,620,583 | B2   | 11/2009 | Sundel |
| 7,739,202 | B2   | 6/2010  | Kadaba |
| 7,751,929 | B1   | 7/2010  | Prater et al. |
| 7,792,762 | B2   | 9/2010  | Podgurny et al. |

(Continued)

FOREIGN PATENT DOCUMENTS

| WO | WO 01/13261 A1     | 2/2001 |            |
| WO | WO-2016012741 A1 * | 1/2016 | ............. G06Q 50/28 |
| WO | WO-2016113308 A1 * | 7/2016 | ............ G06Q 10/047 |

OTHER PUBLICATIONS

Reiner Jedermann, Mike Nicometo, Ismail Uysal, and Walter Lang; "Reducing food losses by intelligent food logistics"; Jun. 2014 (Year: 2014).*

(Continued)

*Primary Examiner* — Resha Desai
*Assistant Examiner* — Dione N. Simpson
(74) *Attorney, Agent, or Firm* — Sterne, Kessler, Goldstein & Fox P.L.L.C.

(57) ABSTRACT

Systems and methods of performing logistical management are provided. The logistical management system may receive a request to ship a package from an electronic device associated with a user. The request can include an initial location and information relating to one or more characteristics of the package. In response to receiving the request, electronic data store may be queried to determine a set of possible itineraries for the package. The set of possible itineraries can then be validated against a set of pre-determined rules to produce a subset of itineraries. One of the subset of itineraries can then be chosen.

20 Claims, 10 Drawing Sheets

(56) References Cited

U.S. PATENT DOCUMENTS

| | | | |
|---|---|---|---|
| 8,131,651 | B1 | 3/2012 | Bennett et al. |
| 9,082,144 | B2 | 7/2015 | Jones et al. |
| 9,127,945 | B2 | 9/2015 | Telang et al. |
| 2005/0289018 | A1* | 12/2005 | Sullivan .................. G06Q 30/00 705/26.5 |
| 2006/0145837 | A1 | 7/2006 | Horton et al. |
| 2006/0282277 | A1 | 12/2006 | Ng |
| 2009/0125355 | A1 | 5/2009 | Handel et al. |
| 2010/0280748 | A1* | 11/2010 | Mundinger ........ G01C 21/3423 701/532 |
| 2013/0091069 | A1 | 4/2013 | Loebertmann et al. |
| 2013/0297549 | A1* | 11/2013 | Yano ....................... G08B 19/00 706/46 |
| 2014/0304188 | A1 | 10/2014 | Lavoie et al. |
| 2014/0358703 | A1 | 12/2014 | Stuntebeck et al. |
| 2015/0096266 | A1 | 4/2015 | Divine et al. |
| 2015/0186869 | A1 | 7/2015 | Winters et al. |
| 2015/0278758 | A1* | 10/2015 | Kim ................... G06Q 10/0835 705/338 |
| 2015/0294238 | A1* | 10/2015 | Benque ................ G06Q 10/025 705/6 |
| 2016/0117618 | A1 | 4/2016 | Wang et al. |
| 2016/0140632 | A1 | 5/2016 | Kandala et al. |
| 2016/0180274 | A1* | 6/2016 | Zwakhals ............ G06Q 10/087 705/7.25 |
| 2016/0189102 | A1 | 6/2016 | Schreiber |
| 2016/0350711 | A1 | 12/2016 | Tsao |
| 2019/0236523 | A1 | 8/2019 | Bulcao et al. |

OTHER PUBLICATIONS

Harris, Irina et. al; "ICT in multimodal transport and technological trends: Unleashing potential for the future"; Sep. 16, 2014. (Year: 2014).*

U.S. Appl. No. 16/381,486, "Logistical Management System," to Bulcao et al., filed Apr. 11, 2019.

International Search Report and Written Opinion of the International Searching Authority directed to related International Patent Application No. PCT/US17/56753, dated Feb. 2, 2018; 13 pages.

International Preliminary Report on Patentability directed to related International Patent Application No. PCT/US17/56753, dated Apr. 23, 2019; 10 pages.

Search Report & Written Opinion of the Intellectual Property Office of Singapore directed to related Singapore Patent Application No. 11201902781S, dated Apr. 21, 2020; 10 pages.

Supplementary European Search Report of the European Patent Office directed to related European Patent Application No. 17861277.6, dated Apr. 16, 2020; 9 pages.

* cited by examiner

Shipping Company     Air Waybill

Date _09/12/2016_    Acct. # _123-456-789_

Sender Name _John Q. Sender_    Phone _(202) 555-5555_

Company _Destination Co._

Address _123 Real Street_    City _Zenith_

State _Winnemac_    Zip _12345_

FIG. 4

LOGISTICAL MANAGEMENT SYSTEM

BACKGROUND OF THE INVENTION

Transporting goods between two points often involves tradeoffs. As an example, the cost of transport and the speed with which an item is transported are frequently inversely proportional—faster transportation costs more and less expensive transportation can be slower. In some applications, it is very important that one of these aspects is optimized. For instance, an organ for transplant might need to reach its destination as fast as possible no matter the cost. Conversely, for other items, minimization of the transportation cost might be the most important criterion.

Historically, such optimizations were accomplished largely on an ad hoc basis requiring significant user input and time to accomplish. Additionally, the historical methods were often based on incomplete information, so sub-optimal solutions were reached. In view of the increasing demand for logistical optimization, better solutions are needed.

BRIEF SUMMARY OF THE INVENTION

Systems and methods of performing logistical management are provided. According to embodiments, a management system may include an interface coupled to an electronic data store and one or more processors coupled to the interface. The one or more processors can be configured to receive a request to ship a package from an electronic device associated with a user. The request can include an initial location and information relating to one or more characteristics of the package. In response to receiving the request, the one or more processors may query the electronic data store to determine a set of possible itineraries for the package. The set of possible itineraries can then be validated against a set of pre-determined rules to produce a subset of itineraries. One of the subset of itineraries can then be chosen.

According to embodiments, the one or more processors may select the itinerary by first sorting the subset of possible itineraries according to a criterion, and then selecting the itinerary that is the highest ranking according to the criterion. The criterion my include one or more of a cost, a distance, a duration of the itinerary, a total number of segments, and a risk associated with the itinerary. Additionally, in some embodiments, the one or more processors may select the itinerary by presenting a subset of itineraries to a user device and receiving a response indicating a selection from among the subset of itineraries.

In some embodiments, the one or more processors are further configured to consider one or more characteristics of the package. For instance, the characteristics of the package may comprise a weight, a volume, a hazard level, a content, a durability, a shape, dimension measurements, a fragility of the package, and a density. In some embodiments, itineraries that are incompatible with one of the characteristics can be also be eliminated from the set of itineraries. Additionally, itineraries that are temporally infeasible can be eliminated.

In some embodiments, each of the itineraries comprises a plurality of itinerary segments. In such embodiments, the one or more processors may be configured to receive a plurality of itinerary segments from the electronic data store and to construct the set of possible itineraries from the plurality of itinerary segments. Additionally, the one or more processors can be configured to eliminate itinerary segments from the plurality of itinerary segments based on a compatibility of that segment with a characteristic of the package. Additionally the various segments may rely on different modes of transportation (e.g., ground, air, rail, etc.)

Additional systems and methods relating to logistical computer systems are provided. According to one such embodiment, a logistical computer system may comprise a network interface coupled to an electronic network and one or more processors coupled to the network interface. The one or more processors may be configured to initiate a trip for a package between a first location and a second location. The user associated with a mobile device may be selected to transport the package between the first location and the second location. Scan information relating to the package at the first location may be received from the mobile device via the electronic network. Additionally, scan information relating to the package the second location may be received from the mobile device via the electronic network.

According to some embodiments, the user associated with the electronic device may be selected based on a certification associated with the user. Furthermore, the one or more processors can be configured to select the user by transmitting a notification indicating that the trip is available to a plurality of electronic devices that are each associated with a user and receiving an acceptance from one of the plurality of electronic devices.

In some embodiments, the one or more processors may generate a transit document based on information associated with the package and transmit an electronic representation of the transit document to the electronic device associated with the user. Additionally and/or alternatively, the one or more processors may optionally transmit the transit document to a transit provider (e.g., a cargo air carrier). According to some embodiments, the representation of the transit document may comprise a graphical representation of, for instance, an airway bill for a particular transit provider (e.g., an airline company).

According to some embodiments, the one or more processors may be configured to detect an error in the first scan information. If or when this occurs, the one or more processors may be configured to assign new scan information to the package.

According to various embodiments, the one or more processors may be configured to generate route information for a trip associated with transporting the package. This route information may be transmitted to the electronic device via the electronic network. Additionally, if a change in the itinerary is received, the one or more processors are optionally further configured to receive, generate, and transmit updated route information to the electronic device based on the received change in the itinerary. Additionally, a graphical representation of the trip progress (e.g., a map) can be generated and transmitted to one or more electronic devices associated with a customer.

BRIEF DESCRIPTION OF THE DRAWINGS/FIGURES

Embodiments of the present disclosure will now be described, by way of example only, with reference to the accompanying schematic drawings in which corresponding reference symbols indicate corresponding parts. Further, the accompanying drawings, which are incorporated herein, form part of the specification and illustrate embodiments of the present disclosure.

FIG. 4 is a representation of a display of an electronic device that may be used in conjunction with embodiments of the disclosure.

Figure 1:
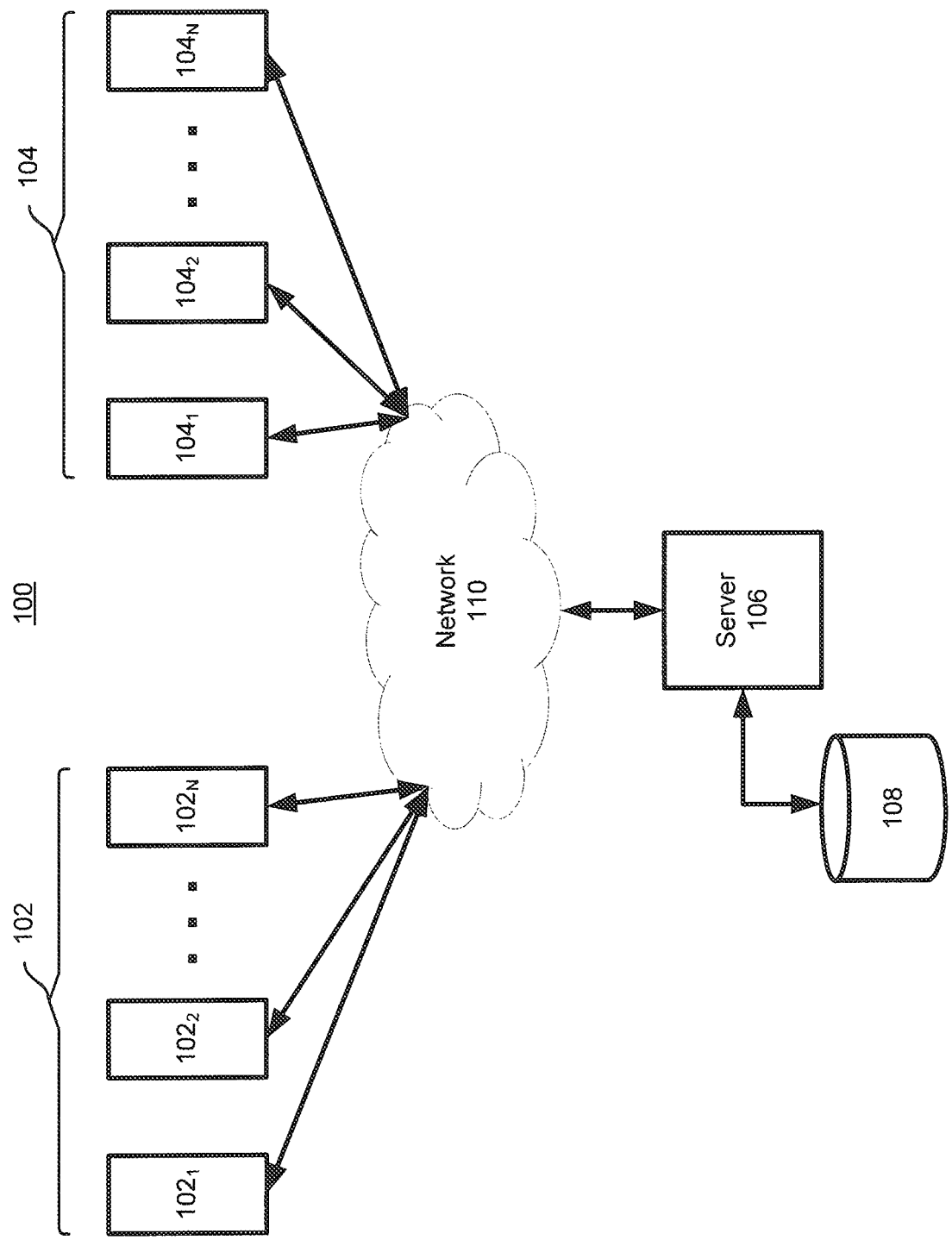
FIG. 1 is a functional block diagram depicting a logistical system according to embodiments of the disclosure.

The features and advantages of embodiments of the present disclosure will become more apparent from the detailed description set forth below when taken in conjunction with the drawings. In the drawings, like reference numbers generally indicate identical, functionally similar, and/or structurally similar elements.

DETAILED DESCRIPTION OF THE INVENTION

This specification discloses one or more embodiments that incorporate the features of this disclosure. The disclosed embodiment(s) merely exemplify the present disclosure. The scope of the present disclosure is not limited to the disclosed embodiment(s). The present disclosure is defined by the claims appended hereto.

The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to affect such feature, structure, or characteristic in connection with other embodiments whether or not explicitly described.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Overview

Figure 2:
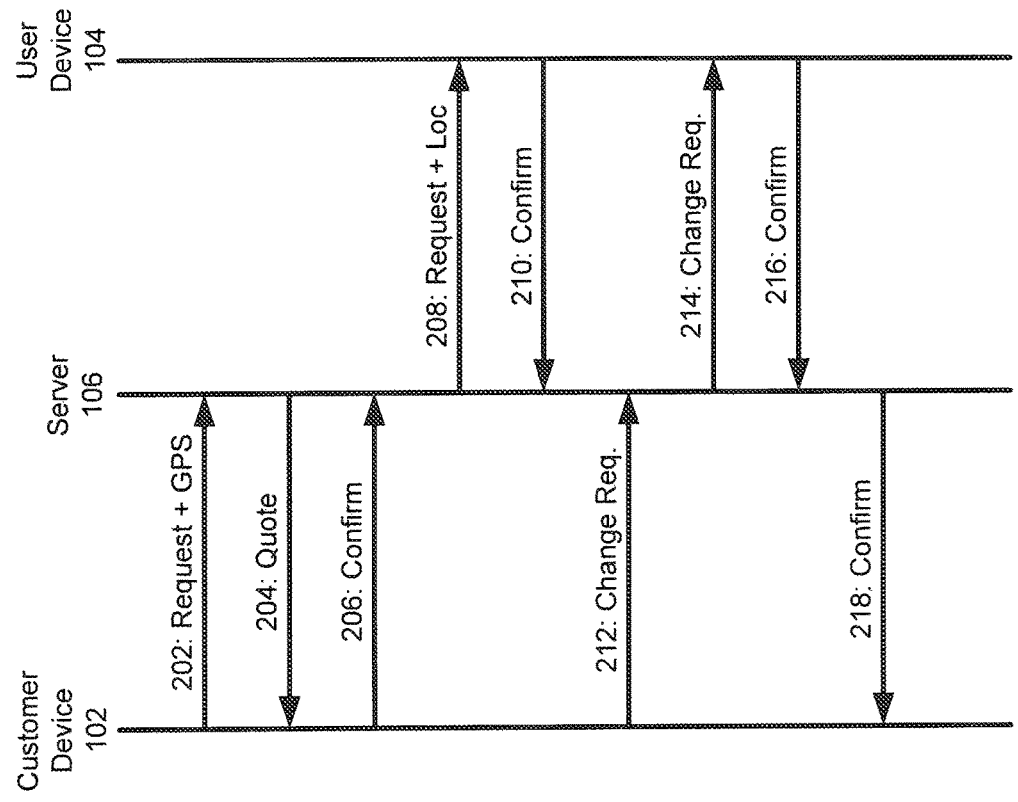
FIG. 2 is a sequence diagram depicting communication between various components of a logistical system according to embodiments of the disclosure.
Figure 3:
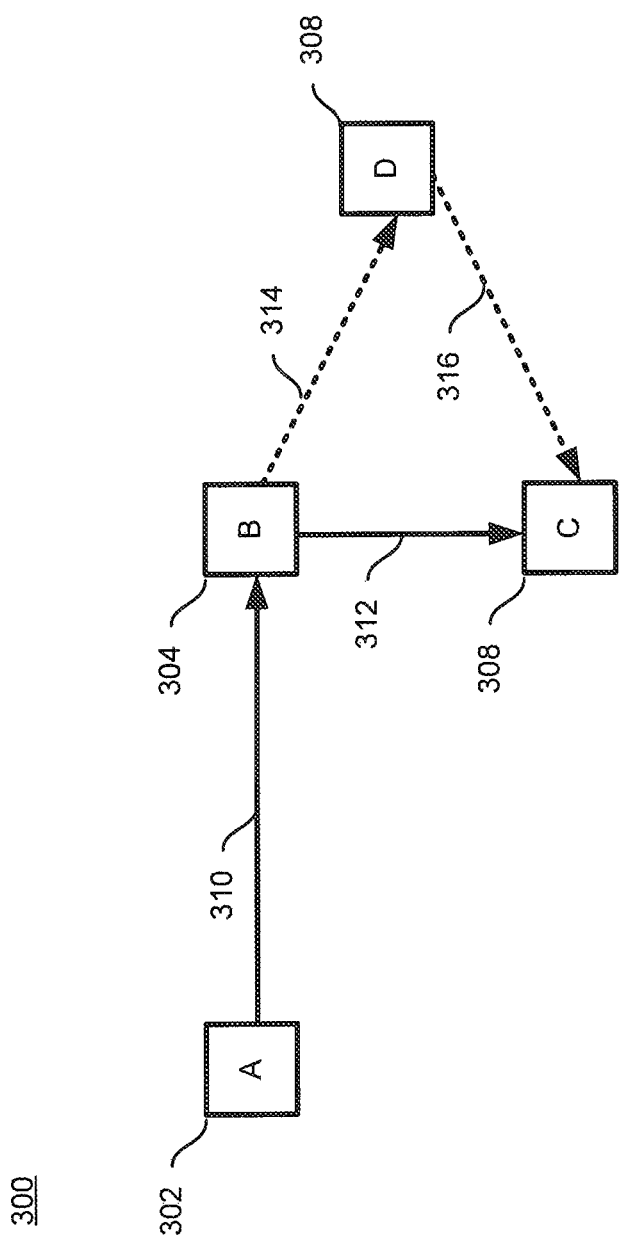
FIG. 3 is a diagram depicting various routes and route segments according to embodiments of the disclosure.

This section will give a brief overview of the various functionality of a logistical management system with reference to FIGS. 1-3. Subsequent sections will describe various aspects of the logistical management systems in greater detail.

FIG. 1 is a functional block diagram depicting a logistical management system 100 according to various embodiments. The logistical management system 100 may include a plurality of customer devices $102_1$, $102_2$, . . . , and $102_N$ (collectively and generically referred to as "customer device 102"). According to embodiments, the customer devices 102 may comprise mobile electronic devices (e.g., cell phones, tablet computers, laptop computers), personal computers, or the like and may be configured to connect to a communication network 110.

The logistical management system 100 may also include a plurality of user devices $104_1$, $104_2$, . . . and $104_N$ (collectively and generically referred to as "user device 104"). According to embodiments, the user devices may comprise mobile electronic devices (e.g., cell phones, tablet computers, laptop computers), personal computers, or the like and may also be configured to connect to the communication network 110.

The logistical management system 100 may also include a control system 106 connected to communication network 110. The control system may comprise one or more computer systems (e.g., a computer system such as the one described with reference to FIG. 10, below), and may also be communicatively coupled to a data store element 108. The data store element may comprise a conventional database system according to some embodiments. Alternatively, the data store element 108 may comprise a portion of the control system 106 and be integral to it.

In some embodiments, the data store element 108 may contain segment information to be used to generate itineraries or routes between a first location and a second location. For instance, data store 108 may contain flight data segments for a plurality of air transportation providers, train schedules, shipping schedules, and the like.

The communication network 110 may comprise any suitable communication network. For instance, according to some embodiments, the communication network may comprise an Internet, WiFi, LAN, WLAN, WAN, PAN, etc.

Using the various components of the logistical management system 100, logistics for the physical transport of various items can be arranged. FIG. 2 is a sequence diagram 200 illustrating one way the various components of logistical management system 100 can work together to affect the transport of an item. For clarity, the sequence diagram of FIG. 2 will be described with reference to FIG. 1, but it should be understood that this is for explanatory purposes only and that the principles outlined in FIG. 2 are not so limited to the specific embodiment of FIG. 1.

As shown in the sequence diagram 200, a customer device 102 may send a request 202 to the control system 106 via communication network 110. The request 202 may include information relating to a particular item or package that needs to be transported as well as a GPS location of the current location of the package. Optionally, the control system 106 may return to the customer device 102 a quote 204 relating to a feasibility, timeline, or cost of transporting the item or package from the request. If the quote 204 is acceptable to user device 102, then it can transmit a confirmation 206 to control system 106 via communication network 110. Alternatively, communications 204 and 206 may be omitted in some embodiments and sequence can proceed directly to message 208 upon receipt of request 202.

After receiving the confirmation 206, the control system 106 may send a request message 208 to a number of user devices 104. The request message 208 may contain information relating to the specifics of the package to be transported as well as a location of the package and a destination. When a user device 104 determines to accept the request, it sends a confirmation message 210 to the control system 106. At this point, the sequence may optionally end. However, some embodiments of the sequence 200 allow for real-time changes to the transportation request 202.

When such a change is desired, a customer device 102 can transmit a change request message 212 to control system 106. The control system 106 may then generate and transmit a change request message 214 formatted for the user device 104. Upon receipt of the change request message 214, the user device 104 may send a confirmation message 216 to control system 106 and the control system 106 may then transmit a confirmation message 218 to the customer device 102.

Routing

One important aspect of transporting items or packages from one location to another is creating an itinerary or route for a user to take from the first location to the destination. FIG. 3 illustrates a simple example of this kind of routing according to some embodiments.

FIG. 3 depicts a routing diagram 300 according to embodiments. The diagram 300 depicts locations A 302, B 304, C 306, and D 308. Additionally, trip segments 310, 312, 314, and 316 are depicted. Each of the trip segments 310, 312, 314, and 316 is a path between discrete locations (e.g., A 302, B 304, C 306, and D 308). An itinerary may comprise one or more segments. For instance, to transport a package between location A 302 and location B 304, only segment 310 is needed. Thus a complete itinerary for this trip would consist of just segment 310. However, to transport a package from point location A 302 to location C 306, the itinerary must comprise multiple segments—in this case, segments 310 and 312.

Each of the trip segments may be performed by different means of transportation. For instance, some may comprise ground transport and some may comprise air transport. Consider, for example, two trips between location A 302 and location C 306 that could be represented by routing diagram 300. The first trip may comprise segments 310 and 312. In this example a driver with, e.g., a user device 104 could start a location A 302 and proceed to location B 302 to pick up a package based on a received request 208. From location B 302 to location C 306, the package could proceed along segment 312, another ground route.

However, FIG. 3 also depicts an alternative path to location C 306 from location A 302. In this path, the package can proceed along segment 314 to location D 308 and then to location C 306 via segment 316. There are a number of reasons this alternative might be favored. For instance, if segment 312 is ground route, and 314 and 316 are air routes, it might be faster to take the route with segments 314 and 316 even though there are more individual segments.

A challenging aspect to transporting a package between two locations is determining an optimal path for that package. For instance, a package weighing 5,000 lbs. may have many fewer options than a package weighing 5 lbs. In the case of the 5,000 lb. package, freight transportation must be arranged, heavier trucks used, and lifts must be arranged at the pickup and destination. On the other hand, the 5 lb. package can easily fit in a common deliver van and placed on virtually any commercial flight or other means of transportation. Accordingly, an important aspect to determining the routing for a package involves considering the characteristics of a package. For instance, if a package requires heavy trucks, it could be that segment 312 is unavailable because that segment is a residential street that prohibits heavy trucks. Accordingly, in that case, to get to the heavy package to location C 306, routing might have to occur via segments 314 and 316, which may allow the passage of heavy trucks.

Thus, an important first step in routing a package from a first location to a second location will be to consider the various physical characteristics of the package. Consider a sample order that is to be flown from a pickup location to a destination. In this case, as part of the request 202, the control system 106 may receive a total volume of the package and an associated weight of that package from the customer device 102. The control system 106 can then determine the correct vehicles and/or trip segments that are available for transportation of the package.

After determining, for instance, the correct vehicle types for transporting the package, the control system 106 can calculate an optimum path for those vehicles. This can begin by verifying the addresses contained in the request message 202 for the pickup and destination locations and geocoding them according to some embodiments. If the package is to travel via air, the control system can also determine the closest airports and query a database (e.g., data store 108) of flight segments connecting the two airports. The search may be constrained by, for instance the correct vehicle type that was determined previously. For instance if the package is big and/or heavy, the query may be constrained to return only freight lights. If the package is small and/or light, on the other hand, the search might not be so constrained.

The control system 106 may calculate a drive distance between the pickup location and the pickup airport and the destination airport and the ultimate destination. After calculating the drive distance, the control system 106 may further exclude flights that will be temporally unavailable because of the required drive times. Additionally, the control system 106 may consider factors such as congestion at an airport and traffic when making this determination.

Figure 5:
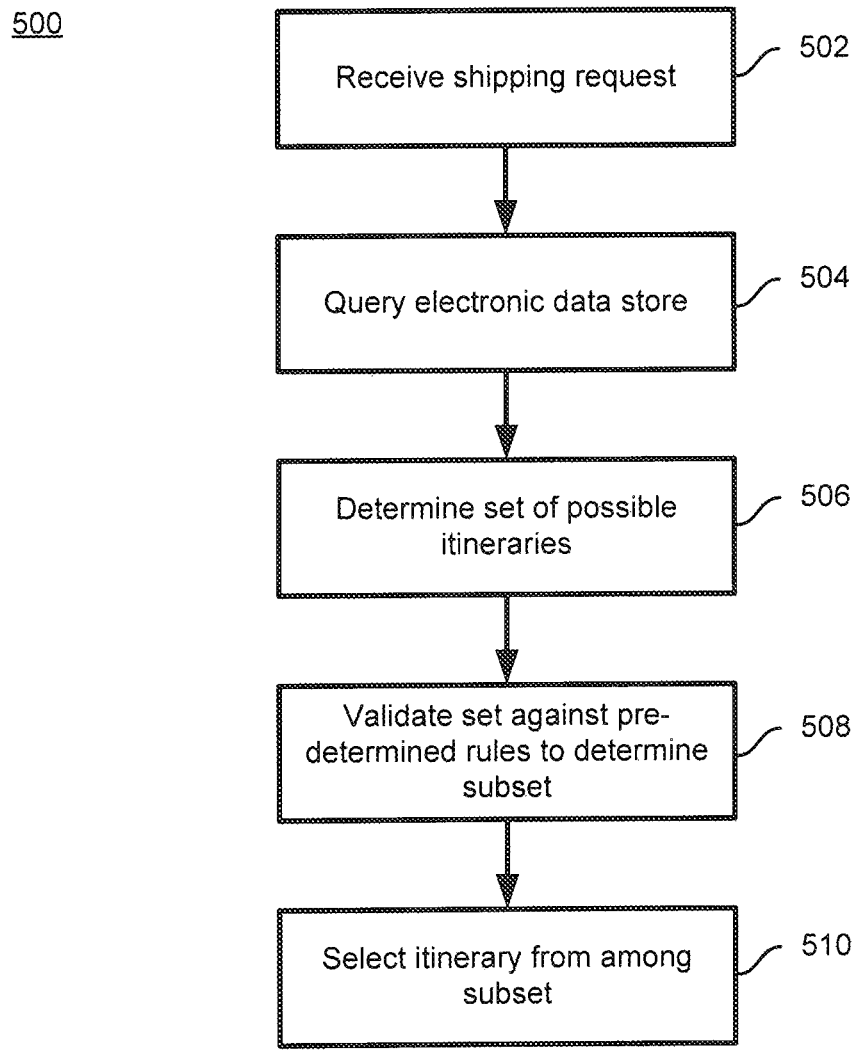
FIG. 5 is a flowchart depicting a method of selecting an itinerary according to some embodiments.

FIG. 5 is a flowchart depicting an exemplary method 500 of routing or generating an itinerary according to various embodiments. As shown in FIG. 5, the method 500 begins by receiving a shipping request (e.g., request 202) at, for instance, the control system 106 from, for instance, customer device 102. The shipping request may contain, among other things, a pickup location and a destination location for a package or item to be transported. Since different items need to handled differently during transport—fresh flowers are handled differently than a bundle of bricks, which are both handled differently than hazardous chemicals—the request may also specify a number of different characteristics about the package. The characteristics may include volume, weight, a hazard level, a content, a durability, a shape, dimension measurements, a fragility of the item, a density of the package, and/or any other characteristic of the package that could be relevant to shipping.

At step 504, the control system 106 can query a data store 108 to retrieve a number of itineraries each comprising, for instance, a number of trip segments. The control system 106 can eliminate impossible or impractical itineraries and generate a set of possible itineraries at step 506. This set of possible itineraries can be validated against a set of predetermined rules at step 508 to determine a subset of valid itineraries. From the subset, an itinerary can be selected at step 510. According to some embodiments, the itinerary may be selected by sorting the subset according to various criteria (e.g., cost, speed, etc.) and choosing the highest ranked itinerary. Alternatively, the subset could be presented to a customer and the customer allowed to select the itinerary.

Figure 6:
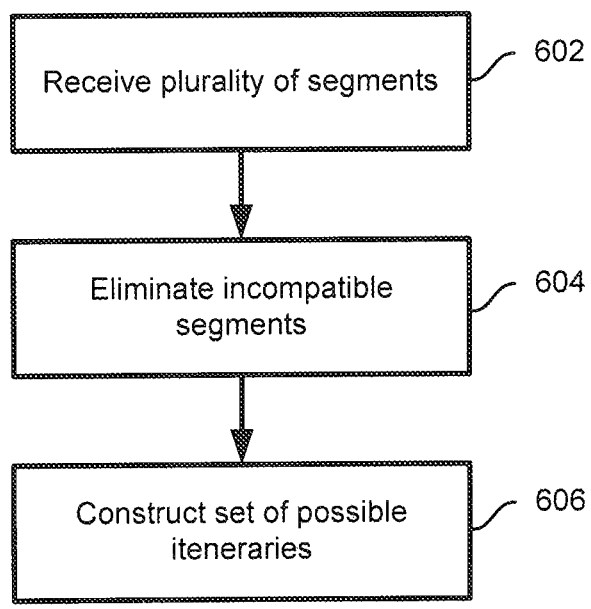
FIG. 6 is a flowchart depicting a method of selecting an itinerary according to some embodiments.

FIG. 6 is a flowchart depicting a method 600 of determining a set of possible itineraries according to various embodiments. For instance, method 600 could be used to perform step 506 from FIG. 5.

As shown in FIG. 6, method 600 begins by receiving a plurality of possible segments 602 from, for instance, the data store 108. For instance, if determining an itinerary for a package that is to travel via air, the control system 106 may query all possible flight segments between a pickup airport and a destination airport. At step 604, the method 600 eliminates incompatible segments from the set of segments received from the data store 108 at step 602. Individual segments may be incompatible for a number of reasons. For instance, segments may be incompatible because of a temporal conflict (e.g., there is simply not enough time to get the package to the airport before the flight time). Additionally, segments may be incompatible due to conflicts with characteristics of the package. For instance, if the package includes hazardous materials, it may be prohibited from traveling on regular commercial airlines or if the package is particularly heavy, it may require a freight airline.

After the incompatible segments are eliminated at step 604, the control system 106 may construct a set of possible itineraries or routes using the compatible segments at step 606.

Dispatch

After transportation for a package has been routed, a user 104 needs to be dispatched to pick up the package. In some embodiments, the control system 106 can offer the route to the closest driver 104 and, if they do not respond in time, offer the job to the next driver. This can greatly reduce the time to dispatch a driver. Alternatively, the control system 106 can offer the route by sending a request 208 to a plurality of user devices 104 at the same time and give the job to the first user device 104 that sends a confirmation message 210 to the control device 106.

When a user/driver accepts a route via a mobile device 104, the control system 106 can automatically send route information to the mobile device 104 to the pickup location. When the driver arrives at the pickup location, a package label is scanned and a client signature may be captured. The scan information and the captured signature may then be uploaded to the control system 106. At this point the control system 106 may verify that the scan information is valid. Additionally, each time the package label is scanned, the scan information may be geotagged.

In order to confirm that the package is correct, the control system 106 must verify the scan information against order information stored by the control system 106 and/or a unique global identifier associated with the package. If there is a problem with the scan information, then the control system 106 may prompt the driver 104 to replace the package label with a new one and the package can be associated with a new identifier at the control system 106.

Upon arrival at the destination, the driver can again scan the package label and the scan information can be geotagged and sent to control system 106 where it can be verified. If the destination is the starting point of a subsequent trip segment the control system 106 can provide additional information to the user device 104. For instance certain air carriers require an airway bill to accept a package for transport. These airway bills contain information relating to the package (e.g., names of the sender and recipient, destination address, etc.). Frequently each carrier requires the airway bill in a different format with slightly different information. Accordingly, based on the carrier, the control system 106 can generate a representation of the appropriate airway bill and send that data to the user device 104.

An example of the generated airway bill is shown in FIG. 4. FIG. 4 depicts an exemplary user device 402 with a display 404. The display can be configured to display the airway bill in the exact format used by the respective shipping company with all of the required fields 406 shown filled as should be filled in by the driver. The driver can then copy the required information directly into the carrier's airway bill at the airport. Alternatively and/or additionally, the control system 106 may be configured to send the airway bill information 406 directly to the carrier in electronic form.

Figure 7:
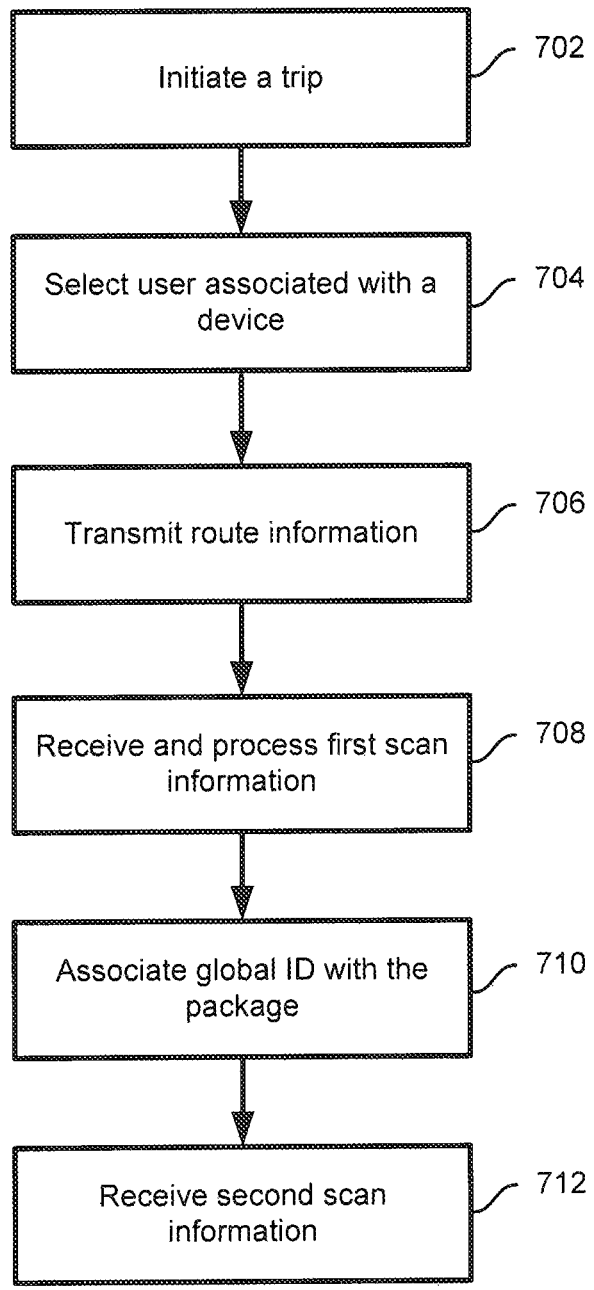
FIG. 7 is a flowchart depicting a method of managing an itinerary according to some embodiments.

FIG. 7 depicts is a flowchart depicting a method 700 of dispatching according to various embodiments. The method 700 begins at step 702 when a trip initiated when, for instance, the control system 106 receives a request 202 from a customer 102. The control system 106 can then select one of a plurality of users associated with a plurality of user devices 104 at step 704. According to some embodiments, the control system 106 may select the user device 104 based on a proximity of the user device 104 to a pickup location associated with the request 202. However, the control system 106 may also select a user device 104 by sending a request 208 to a plurality of user devices 104 and selecting whichever of the plurality of user deices 104 responds first.

At step 706, the control system 106 may transmit route information to the selected user device 104. The route information may include information detailing a route that the user should take from a first location to a second location. When the user 104 reaches the pickup location and scans the package information, the package information can be transmitted to and received by the control system 106. The package scan information can then be processed to verify that the scan information is valid against saved information associated with the package such as a unique global identification number, at step 710. At step 712 the control system 106 can receive second scan information from the selected user device 104 when it reaches its destination location.

Figure 8:
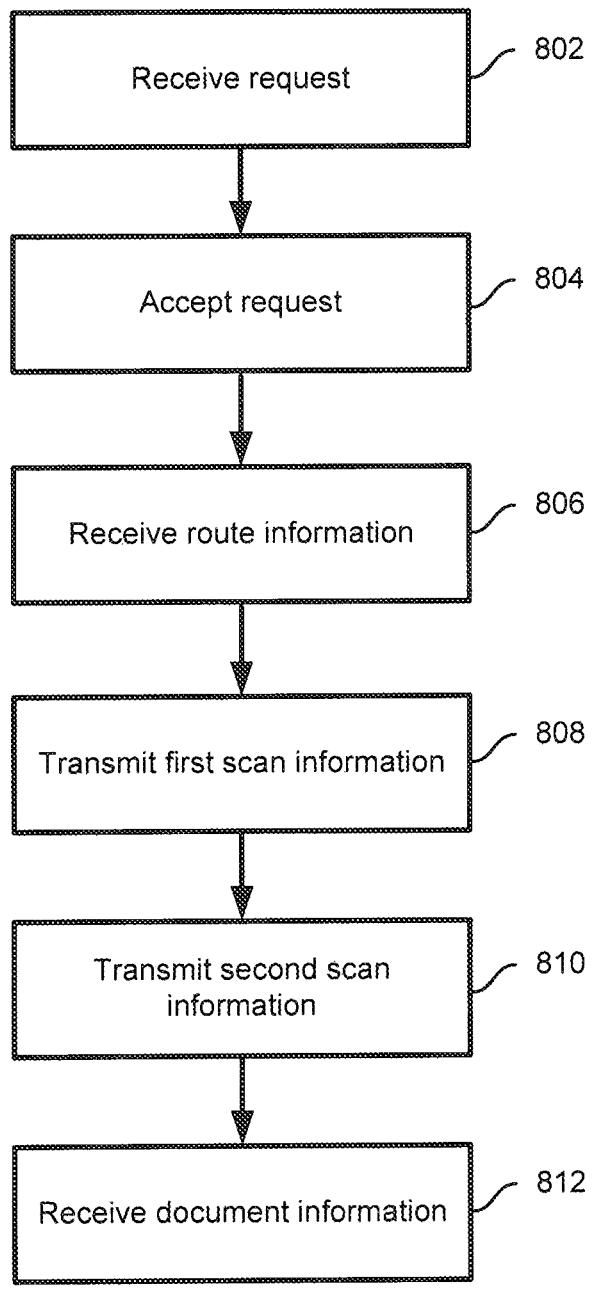
FIG. 8 is a flowchart depicting a method of managing the transport of a package according to some embodiments.

FIG. 8 is a flowchart depicting a method 800 of a user device 104 being dispatched by a control system 106 according to various embodiments. The method begins at step 802 when a user device 104 receives a request (e.g., request 208) from control system 106. At step 804, the user device 104 may transmit an indication to the control system 106 indicating that the request 208 is accepted. In response to accepting the request, the user device 104 may receive route information 806 from the control system 106.

When the user device 104 reaches the pickup location, package label information can be scanned. The scanned package information can then be transmitted to the control system 106 at step 808. The scanned package information may also include an image of a signature from the sender. When the user device 104 reaches its destination, the package label can be scanned a second time and the second scan information can be transmitted to control system 106. In response to receiving the transmitted second scan information, the control system can send transit document information to user device 104. The transit document information may comprise a graphical representation 406 of a transit document associated with a carrier according to some embodiments.

Figure 9:
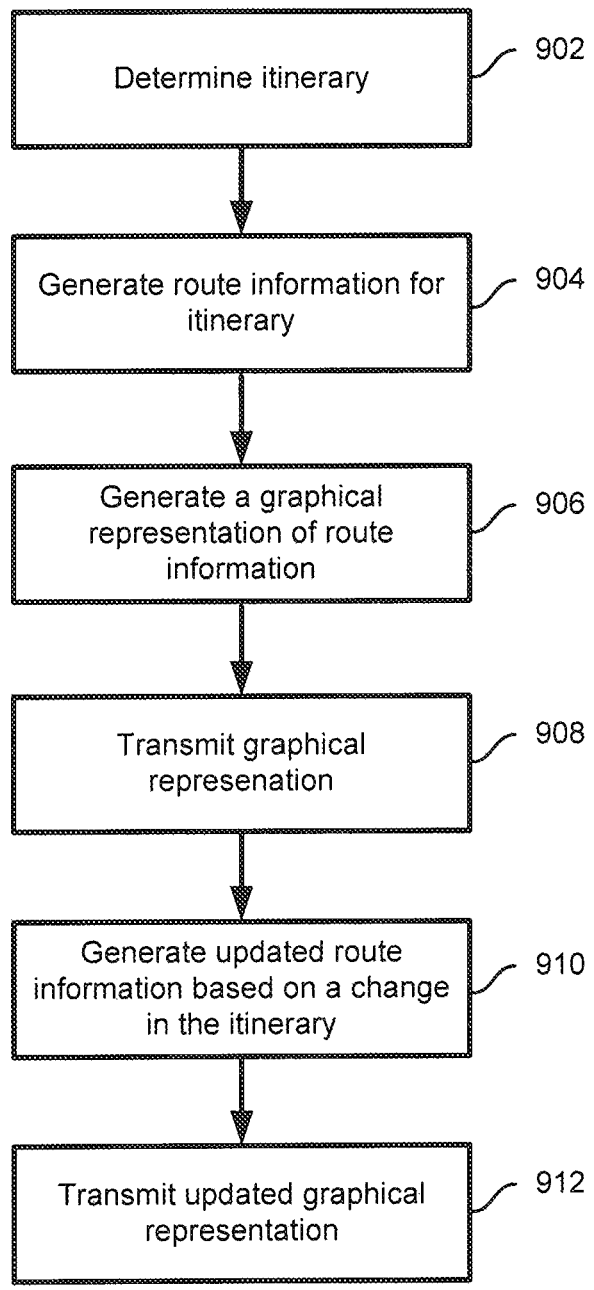
FIG. 9 is a flowchart depicting a method of managing the transport of a package according to some embodiments.

FIG. 9 depicts a method 900 of routing and dispatching a package according to various embodiments. The method 900 begins at step 902, when a control system 106 determines an itinerary. According to some embodiments, step 902 can be performed consistently with method 500 depicted in FIG. 5. At step 904, route information for a user 104 can be generated for the determined itinerary. At step 906, a graphical representation of the route information (e.g., a map) can be generated by the control system 106. The graphical representation of the route information can then be transmitted to a customer device 102 at step 908. Optionally, if or when the control system 106 receives an updated itinerary, updated route information can be generated at step 910. An updated graphical representation based on the updated itinerary can then be transmitted to the customer device 102.

EXAMPLE

The following example describes a possible use case according to embodiments of the disclosure. For convenience, this example will be described with reference to FIGS. 1-9, but the description should not be construed as being limited to these particular embodiments.

Consider a situation where a user, Client A, wants to ship two packages containing ocular tissue from an eye bank to a hospital. Because the ocular tissue can expire in a matter of just a few hours, Client A is unable to ship with any next day provider. Instead, Client A needs the shipments to be completed on time and as fast as possible because the recipient is likely scheduled for a major surgery upon arrival of the shipment.

To initiate a shipment, Client A enters relevant origin information (e.g., pickup address, pickup time, etc.) into device 102. The device may then display information validating the origin information entered into device 102 by Client A. According to some embodiments, this validation information can take the form of a graphical map representation of the pickup information. Client A may also enter a second address (e.g., a destination address) into device 102. This second address may be validated in a similar fashion to the origin information entered by client A into device 102.

The device 102, according to some embodiments, may also be configured to prompt Client A to enter relevant characteristic information about the package or packages to be delivered (e.g., he dimensions, weights, etc.) In this example, let us assume that one of the two packages to be shipped happens to be light and oddly shaped while the other is quite heavy due to the required refrigeration. Device 102 may be configured to then prompt Client A to enter relevant billing and/or reference number and finally the recipient surgeon's email address for notification of the status of the shipment.

After any relevant information is entered into device 102, a request 202 is generated and sent to a remote server 106 via an appropriate network 110. The server 106 may then determine the closest airports to the origin address and destination address and then searches a database (e.g., memory store 108) containing available flights. Based on the available flights, the server 106 may determine the possible routes. However, the soonest flight is not always valid. A driver needs time to pickup the package and drive to the airport. Airlines have different cut off times and airports have different levels of congestion. Server 106 may maintain a database of every airport, airline cut off times, average time to tender a package to the airline as well as cargo hours. This ensures that the final route takes in all possible temporal variables associated with tendering a package. For instance, in this example, assume that Client A anticipates a route from San Diego Airport to JFK. However, the San Diego cargo areas open later so, although the flight leaves sooner, server 106 may be configured to choose the longer drive to LAX because the cargo at LAX does not close. It also chooses Airline #1 instead of Airline #2 based on a cut off time for delivery for Airline #1 is only 60 minutes instead of 90. This gives the driver time to get to LAX in time to tender the package to get it on the optimal flight. The sever 106 may also be configured to add the drive time, airline cut off time, airport delay time and drive to destination time to the airline departure to calculate the fastest possible route that is achievable for that shipment.

An additional factor that server 106 may be configured to consider when determining the appropriate route is the certifications of the available drivers. For instance, in this example, it is possible that not every driver is certified to carry human tissue. Accordingly, the server 106 can be configured to only select drivers that have the appropriate certifications to carry that commodity type. For instance, only drivers that have dangerous goods training are dispatched for dangerous goods shipments. In some embodiments, each driver's profile when he or she logs in with device 104 is linked a corresponding driver profile maintained by the server 106. According to some embodiments, the driver profile maintained by server may contain additional data including certifications, vehicle information, vehicle capacity, driver history, etc.

In this example, the delivery requires a driver that is certified to carry human tissue. If there happen to be four drivers in the area near the pickup location, the server 106 can chose among them. If, of the four drivers in the area, three have the certifications needed to carry human tissue, then the server 106 can be configured to choose among them based on additional criteria. For instance, if only two of the certified drivers have a van large enough to accommodate the shipment, then the server 106 can be configured to choose one of those drivers either randomly or according to some other criteria (e.g., seniority, performance, etc.). According to some embodiments, the server 106 may sends a push notification (e.g., request 208) to the closest driver's device 104 via network 110. If that first driver is unable to take the shipment at this time do he can reject the order by providing an appropriate input to device 104. The rejection is then transmitted to the server 106 via network 110. Server 106 may then be configured to automatically sends a push request (e.g., request 208) to the next closest driver's device 104 that meets the criteria. When the second driver accepts (e.g., confirmation 210) she can automatically be routed to the pickup location by device 104.

While the driver is en route to the pickup location, server 106 may provide client device 102 information confirming that the driver is en route. In some embodiments, client device 102 may be configured to display information indicating a specific location along the route (e.g., segment 310) at which the driver is currently located.

In some embodiments, the client device 102 may be configured to receive labels for each package to be printed (by, e.g., Client A) and placed on each of the packages to be shipped. When the driver arrives to receive the packages, she can use device 104 to scan the label on each piece of the order to ensure that every piece and only the pieces associated with that order are collected. If it device 104 determines that there is an error associated with one of the labels (e.g., Client A put a wrong label on a piece), then device 104 can be configured to associate a new label with the order. Additionally, if no label is present on a package, device 104 can be configured to associate a new or blank label with the order and to communicate that information to server 106

After scanning each piece with device 104, the driver may be prompted to collect a signature on, for instance, a graphical user interface associated with device 104. Client A inputs a signature into device 104 and can also be prompted to enter additional information (e.g., a name, company, department, etc.) In some embodiments this information is transmitted to server 106 where it can be subsequently transmitted to client device 102 for viewing or, additionally and/or alternatively, for viewing on a client web interface.

Once the driver has successfully received the packages, device 104 can be configured to automatically route the driver to the destination, which in this example is LAX. When the driver arrives at LAX, the driver input a confirmation to that effect into device 104 and be, again, prompted to scan each package. After scanning, the scan information is transmitted to server 106 and, in some embodiments, an indication of the driver's successful arrival can be transmitted to a client device 102. In some embodiments, each scan may also be geotagged on a map, which can be viewed by clients using device 102.

Depositing the packages with the airline may require an air way bill (AWB). In some embodiments, the server 106 may be configured to transmit an electronic version (e.g., 404) of an AWB to the driver's device 104 with relevant fields filled in. The driver may then use the electronic version of the AWB 404 to fill out a paper AWB for the airline by simply copying the information from the received electronic version. The driver can then be prompted by device 104 to photograph the completed paper AWB and the photograph can be transmitted to server 106, where it can be associated with the order. Alternatively, in some embodiments, the electronic AWB can be transmitted directly to the airline by either sever 106 or by the driver's device 104.

If, in this example, a problem were to arise such that the chosen flight could not depart that day, then server 106 can be configured to make adjustments. In some embodiments, information indicating problems (e.g., an "unable do deliver" message) can be input to device 104 and transmitted to sever 106. The sever 106 can be configured to determine an alternative flight for the package and this change can be transmitted to the driver's device and, if necessary, a new electronic AWB 404 generated. Upon successful delivery of the packages, the driver can input information to device 102 indicating that the packages have been successfully delivered to the airline and this information can be subsequently transmitted to server 106. The driver can then receive an indication on device 104 releasing the driver from the order and indicating availability to be selected for additional orders.

In some embodiments, the sever system 106 may monitor the information from the airline to "listen" for the takeoff of the flight on which the packages are scheduled. In some embodiments, when the plane takes off, the server 106 may receive information notifying it of the takeoff and may update a workflow. Additional background tasks may also be initiated at this point to "listen" for the arrival of the plane at its destination. When the plan arrives, the server 106 system may receive information to that effect and may, subsequently, being the process (e.g., process 700) of selecting qualified drivers near the destination airport. And the process for transporting the packages from the destination airport to the final destination can be repeated essentially as discussed above.

Figure 10:
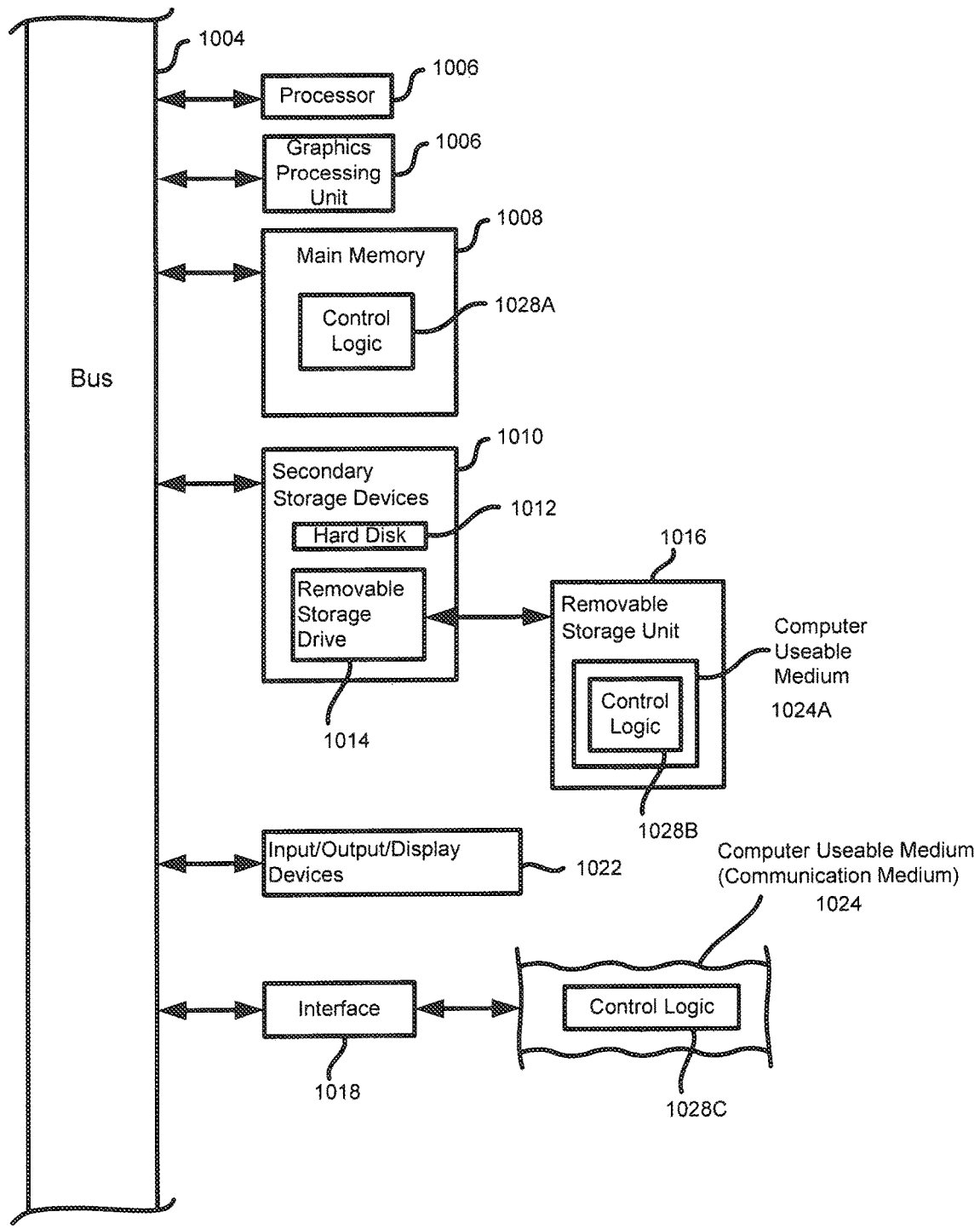
FIG. 10 is a functional block diagram depicting an example computer system that can be used to implement various aspects of embodiments of this disclosure.

Various embodiments can be implemented, for example, using one or more well-known computer systems, such as computer system 1000 shown in FIG. 10. For instance, each of the components 102, 104, 106, and 108 described with reference to FIGS. 1 and 2 could be implemented using a computer system such as computer system 1000. Computer system 1000 can be any well-known computer capable of performing the functions described herein.

Computer system 1000 includes one or more processors (also called central processing units, or CPUs), such as a processor 1004. Processor 1004 is connected to a communication infrastructure or bus 1006.

One or more processors 1004 may each be a graphics processing unit (GPU). In some embodiments, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure 1006 through user input/output interface(s) 1002.

Computer system 1000 also includes a main or primary memory 1008, such as random access memory (RAM). Main memory 1008 may include one or more levels of cache. Main memory 1008 has stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018.

According to some embodiments, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

In some embodiments, a tangible apparatus or article of manufacture including a tangible computer useable or readable medium having control logic (software) stored thereon is also referred to herein as a "computer program product" or "program storage device." This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 10. In particular, embodiments may operate with software, hardware, and/or operating system implementations other than those described herein.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. An electronic device, comprising:
an interface coupled to an electronic data store storing segment information for generating a plurality of possible itineraries for a package; and
one or more processors coupled to the interface and configured to:
receive, from a computing device of a user, a request to ship the package comprising a GPS location identifying an initial location of the package, a destination of the package; a delivery time of the package at the destination; and one or more characteristics of the package;
determine a destination airport associated with the destination and a first pickup airport and a second pickup airport associated with the initial location;
retrieve, from the electronic data store, segment information comprising a first air route associated with a first airline from the first pickup airport to the destination airport and cargo area hours for the first airport, a second air route associated with a second airline from the second pickup airport to the destination airport, and a third air route associated with a third airline from the second pickup airport to the destination airport and a cargo cutoff time for the third air route;
determine a first driver by comparing the one or more characteristics to a stored driver profile associated with the first driver in a plurality of driver profiles storing a plurality of driver certifications and vehicle capacities to verify that the first driver can carry the package;
generate a set of possible itineraries associated with transporting the package from the initial location to the destination by applying a set of predetermined rules to the segment information to limit the segment information to segments that are compatible with the one or more characteristics, wherein the set of possible itineraries comprises a first possible itinerary comprising the first air route and a first ground route from the current location of the first driver to the GPS location and then to the first airport, a second possible itinerary comprising the second air route and a second ground route from the current location of the first driver to the GPS location and then to the second airport, and a third possible itinerary comprising the second ground route and the third air route;
determine a first arrival time for the first ground route and a second arrival time for the second ground route;
determine a subset of possible itineraries less than the set of possible itineraries by considering congestion at the first pickup airport and the second pickup airport, a tracked average time to tender a package to the first airline, the second airline, and the third airline and eliminating, from the set of possible itineraries, the first possible itinerary in response to the first arrival time being outside the cargo area hours for the first airport and the third possible itinerary in response to the second arrival time being past the cargo cutoff time for the third air route;
select the second possible itinerary from the subset of possible itineraries for the package based on the delivery time of the package at the destination;
send the second possible itinerary comprising the second ground route for transporting the package to a mobile device of the first driver;
send a map comprising the second route and a position of the first driver on the second route to the computing device of the user;
confirm the first driver has picked up the package by verifying first geotagged scan information received from the mobile device of the first driver at the initial location;
receive second geotagged scan information from the mobile device of the first driver at the second airport;
update the map displayed on the computing device of the user based on the second geotagged scan information;
generate a graphical representation of an airway bill for the second air route upon receiving the second geotagged scan information from the mobile device of the first driver at the second airport, wherein a format of the airway bill matches a format required by the second airline; and send the graphical representation of the airway bill to the mobile device of the first driver and to the second airline.

2. The electronic device of claim 1, the one or more processors further configured to:
rank each of the set of possible itineraries according to a criteria, wherein the second possible itinerary is selected based on the rank of the second possible itinerary.

3. The electronic device of claim 2, wherein the criteria comprises at least one of: a cost, a distance, a duration, a total number of segments, and risk.

4. The electronic device of claim 1, the one or more processors further configured to:
present the subset of possible itineraries to the user; and
receive an input from the user selecting the second possible itinerary from the subset of possible itineraries.

5. The electronic device of claim 1, wherein the one or more characteristics comprise: a weight, a volume, a hazard level, a content, a durability, a shape, dimension measurements, a fragility, and a density.

6. The electronic device of claim 5, the one or more processors further configured to:
eliminate, from the set of possible itineraries, itineraries that are incompatible with the one or more characteristics.

7. The electronic device of claim 1, the one or more processors further configured to:
eliminate, from the set of possible itineraries, itineraries that are temporally infeasible.

8. The electronic device of claim 1, wherein the one or more characteristics of the package comprise a commodity type of the package; and
determine the first driver has a certification for the commodity type of the package.

9. The electronic device of claim 1, wherein the one or more processors are further configured to:
receive a photograph of a paper airway bill completed by the first driver, wherein the first driver completes the paper airway bill using the graphical representation of the airway bill sent to the mobile device of the first driver; and
send, in response to the photograph, a release to the first driver.

10. The electronic device of claim 1, wherein the one or more processors are further configured to:
receive a notification that a plane comprising the package and associated with the second air route has landed at the destination airport;
select a second driver after receiving the notification; and
send, after receiving the notification, a ground third route from the destination airport to the final destination to a mobile device of the second driver.

11. A method of determining logistics for shipping a package between an initial location and a destination, the method comprising:
receiving, by one or more processors from a computing device of a user, a request to ship the package comprising a GPS location identifying the initial location of the package, the destination, a delivery time of the package at the destination, and one or more characteristics of the package;
determining, by the one or more processors, a destination airport associated with the destination and a first pickup airport and a second pickup airport associated with the initial location;
retrieving, by the one or more processors from an electronic data store, segment information comprising a first air route associated with a first airline from the first pickup airport to the destination airport and cargo area hours for the first airport, a second air route associated with a second airline from the second pickup airport to the destination airport, and a third air route associated with a third airline from the second pickup airport to the destination airport and a cargo cutoff time for the third air route;
determining, by the one or more processors, a first driver by comparing the one or more characteristics to a stored driver profile associated with the first driver in a plurality of driver profiles storing a plurality of driver certifications and vehicle capacities to verify that the first driver can carry the package;
generating, by the one or more processors, a set of possible itineraries associated with transporting the package from the initial location to the destination by applying a set of predetermined rules to the segment information to limit the segment information to segments that are compatible with the one or more characteristics, wherein the set of possible itineraries comprises a first possible itinerary comprising the first air route and a first ground route from the current location of the first driver to the GPS location and then to the first airport, a second possible itinerary comprising the second air route and a second ground route from the current location of the first driver to the GPS location and then to the second airport, and a third possible itinerary comprising the second ground route and the third air route;
determining, by the one or more processors, a first arrival time for the first ground route and a second arrival time for the second ground route;
determining, by the one or more processors, a subset of possible itineraries less than the set of possible itineraries by considering congestion at the first pickup airport and the second pickup airport, a tracked average time to tender a package to the first airline, the second airline, and the third airline and eliminating, from the set of possible itineraries, the first possible itinerary in response to the first arrival time being outside the cargo area hours for the first airport and the third possible itinerary in response to the second arrival time being past the cargo cutoff time for the third air route;
selecting the second possible itinerary from the subset of itineraries for the package based on the delivery time of the package at the destination;
sending, by the one or more processors, the second possible itinerary comprising the second ground route for transport of the package to a mobile device of the first driver;
sending, by the one or more processors, a map comprising the second route and a position of the first driver on the second route to the device of the user;
confirming, by the one or more processors, the first driver has picked up the package by verifying first geotagged scan information received from the mobile device of the first driver at the initial location;
receiving, by the one or more processors, second geotagged scan information from the mobile device of the first driver at the second airport;
updating, by the one or more processors, the map displayed on the computing device of the user based on the second geotagged scan information;

generating, by the one or more processors, a graphical representation of an airway bill for the second air route upon receiving the second geotagged scan information from the mobile device of the first driver at the second airport, wherein a format of the airway bill matches a format required by the second airline; and sending, by the one or more processors, the graphical representation of the airway bill to the mobile device of the first driver and to the second airline.

12. The method of claim 11, further comprising:

ranking each of the set of possible itineraries according to a criteria, wherein the second possible itinerary is selected based on the rank of the second possible itinerary.

13. The method of claim 12, wherein the criteria comprises at least one of cost, a distance, a duration of the itinerary, a total number of segments, and a risk.

14. The method of claim 11, further comprising:

presenting the subset of possible itineraries to the user; and receiving an input from the user selecting the second possible itinerary from among the subset of possible itineraries.

15. The method of claim 11, wherein the one or more characteristics comprise: a weight, a volume, a hazard level, a content, a durability, a shape, dimension measurements, a fragility, and a density.

16. The method of claim 15, further comprising:

eliminating, from the set of possible itineraries, itineraries that are incompatible with the one or more characteristics.

17. The method of claim 11, further comprising:

eliminating, from the set of possible itineraries, itineraries that are temporally infeasible.

18. The method of claim 11, wherein the one or more characteristics of the package comprise a commodity type of the package, further comprising:

determining the first driver has a certification for the commodity type of the package.

19. The method of claim 11, further comprising:

receiving a photograph of a paper airway bill completed by the first driver, wherein the first driver completes the paper airway bill using the graphical representation of the airway bill sent to the mobile device of the first driver; and sending, in response to the photograph, a release to the first driver.

20. The method of claim 11, further comprising:

receiving a notification that a plane comprising the package and associated with the second air route has landed at the destination airport;

selecting a second driver after receiving the notification; and sending, after receiving the notification, a third ground route from the destination airport to the final destination to a mobile device of the second driver.

* * * * *